(12) United States Patent
Van Dalen et al.

(10) Patent No.: US 8,308,487 B2
(45) Date of Patent: Nov. 13, 2012

(54) MODEL HUMAN EYE

(75) Inventors: Johan T. W. Van Dalen, Tucson, AZ (US); Dan D. Carda, Tucson, AZ (US)

(73) Assignee: Eye Care and Cure Pte. Ltd, Singapore (SG)

( * ) Notice: Subject to any disclaimer, the term of this patent is extended or adjusted under 35 U.S.C. 154(b) by 0 days.

(21) Appl. No.: 13/413,018

(22) Filed: Mar. 6, 2012

(65) Prior Publication Data

US 2012/0231432 A1 Sep. 13, 2012

Related U.S. Application Data

(63) Continuation-in-part of application No. 12/163,838, filed on Jun. 27, 2008, now Pat. No. 8,137,111, which is a continuation-in-part of application No. 11/770,653, filed on Jun. 28, 2007, now Pat. No. 8,128,412.

(51) Int. Cl.
*G09B 23/28* (2006.01)
(52) U.S. Cl. .......................................... 434/271
(58) Field of Classification Search ............ 434/271
See application file for complete search history.

(56) References Cited

U.S. PATENT DOCUMENTS

| | | | |
|---|---|---|---|
| 8,128,412 B2 * | 3/2012 | Carda et al. ............ | 434/271 |
| 8,137,111 B2 * | 3/2012 | Carda et al. ............ | 434/271 |
| 2002/0028429 A1 * | 3/2002 | Umeyama et al. ......... | 434/271 |
| 2004/0097166 A1 * | 5/2004 | Maddocks et al. ........ | 446/392 |

* cited by examiner

*Primary Examiner* — Xuan M. Thai
*Assistant Examiner* — Jerry-Daryl Fletcher
(74) *Attorney, Agent, or Firm* — Dale F. Regelman; Quarles & Brady LLP

(57) ABSTRACT

A model human eye suitable for practicing surgical procedures, comprising a hemispherical-shaped bottom assembly having a bowl-shaped substrate disposed therein, a retinal layer disposed on the bowl-shaped substrate, and a hemispherical-shaped top portion attached to the bottom portion, the top portion comprising a visually transparent cornea portion and a visually opaque sclera portion, wherein the cornea portion and the sclera portion are integrally molded, wherein the cornea portion comprises a posterior corneal surface, wherein a distance from the posterior corneal surface to the retinal layer is an axial length. The model human eye is particularly suited for practicing A-scan ultrasound biometry and optical coherence biometry.

6 Claims, 4 Drawing Sheets

MODEL HUMAN EYE

CROSS REFERENCE TO RELATED APPLICATIONS

This application is a continuation-in-part claiming priority from U.S. Utility application Ser. No. 12/163,838, filed Jun. 27, 2008, which is a Continuation-In-Part and claims priority to U.S. Utility application Ser. No. 11/770,653 filed Jun. 28, 2007. U.S. Utility application Ser. No. 12/163,838 is incorporated herein by reference.

FIELD OF THE INVENTION

This invention relates to a model human eye for pedagogical use by medical professionals.

BACKGROUND OF THE INVENTION

Medical students, interns, residents, and fellows, specializing in diagnosing and treating injuries to, and the diseases of, the eye must necessarily practice certain surgical techniques prior to actually operating on human patients. Prior art training methods often use animal eyes, such as, for example human cadaver eyes or pig eyes.

The use of human cadaver and/or animal eyes (collectively "biological eyes") is burdened with many procedural issues. The biological eyes must be refrigerated before use, and even when refrigerated suffer from a short "shelf life" due to inevitable biological decomposition. The handling of such biological eyes requires compliance with, among other regulations, the Blood Born Pathogens Standard promulgated under the federal Occupational Health and Safety Act. After use, the biological eyes must be properly disposed of.

What is needed is a model human eye that closely mimics the anatomy and physiology of the human eye, but which does not require refrigeration and other special handling procedures.

SUMMARY OF THE INVENTION

Applicants' invention comprises a model human eye that can be used for surgical training purposes, and in particular for practicing A-scan ultrasound biometry and optical coherence biometry. The model human eye comprises a hemispherical-shaped bottom assembly having a bowl-shaped substrate disposed therein, a retinal layer disposed on the bowl-shaped substrate, and a hemispherical-shaped top portion attached to the bottom portion, the top portion comprising a visually transparent cornea portion and a visually opaque sclera portion, wherein the cornea portion and the sclera portion are integrally molded, wherein the cornea portion comprises a posterior corneal surface, wherein a distance from the posterior corneal surface to the retinal layer is an axial length.

Applicants' invention further comprises a method to practice surgical techniques on a model human eye. The method comprises providing a model human eye having a hemispherical-shaped bottom assembly having a bowl-shaped substrate disposed therein, a retinal layer disposed on the bowl-shaped substrate, and a hemispherical-shaped top portion attached to the bottom portion, the top portion comprising a visually transparent cornea portion and a visually opaque sclera portion, wherein the cornea portion and the sclera portion are integrally molded, wherein the cornea portion comprises a posterior corneal surface, wherein a distance from the posterior corneal surface to the retinal layer is an axial length. The model human eye provided is structurally suited for practicing medical procedures including A-scan ultrasound biometry and optical coherence biometry. The method further comprises practicing a medical procedure using the model human eye.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' invention comprises a model human eye that closely mimics the anatomy, physiology, and size of the human eye and is structurally suited to allow physicians to meaningfully practice surgical procedures utilizing their own equipment and instruments. By "structurally suited" Applicant means that the present invention is so configured that training methods utilizing Applicants' model human eye closely mimic surgical procedures performed on actual patients.

Figure 1:
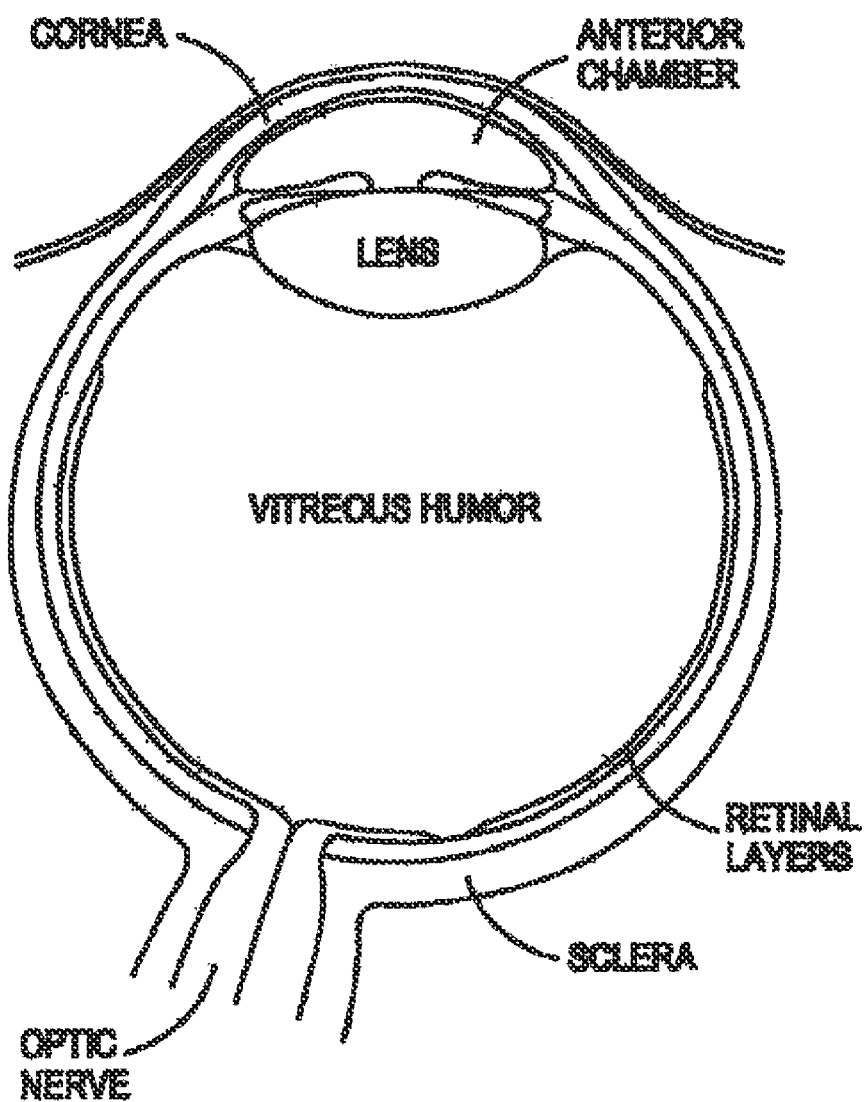
FIG. 1 illustrates a human eye.

Referring now to FIG. 1, the human eye comprises outer layers which include the cornea and the sclera. These layers enclose an anterior chamber disposed in front of the lens, and a larger posterior chamber disposed behind the lens. The anterior chamber is filled with a watery aqueous humor, and the posterior chamber is filled with a jelly-like vitreous body.

Figure 2:
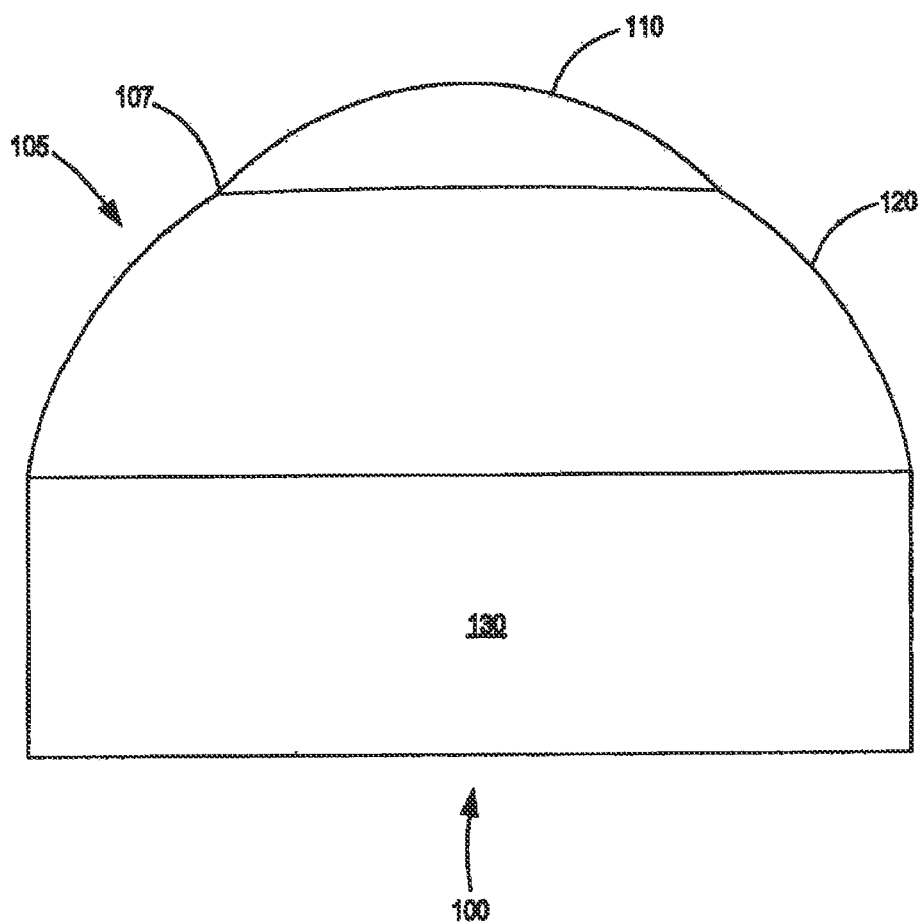
FIG. 2 is a perspective view of Applicants' model eye.

Referring now to FIG. 2, Applicants' model human eye 100 is formed from subassemblies 105 and 130. Sub-assembly 105 comprises cornea portion 110 and sclera portion 120. In certain embodiments, assembly 105 is molded as an integral part. In certain embodiments, assembly 105 is formed by liquid injection molding. In certain embodiments, assembly is formed by injection molding a silicone resin. In certain embodiments, that silicone resin comprises polydimethylsiloxane. In certain embodiments, that silicone resin comprises an elastomeric polydimethylsiloxane.

In certain embodiments, the portion of the mold used to form sclera portion 120 comprises a plurality of microscopic protuberances, i.e. a relatively "rough" surface microscopically. As a result, the molded sclera portion 120 diffracts visible light, and therefore, is visually opaque. In contrast, the portion of the mold used to mold cornea portion 110 does not comprise such microscopic roughness. As a result, cornea portion 110 comprises a smooth surface and does not diffract visible light, and is visually transparent. Border 107 defines the intersection of transparent cornea portion 110 and visually opaque sclera portion.

Figure 3:
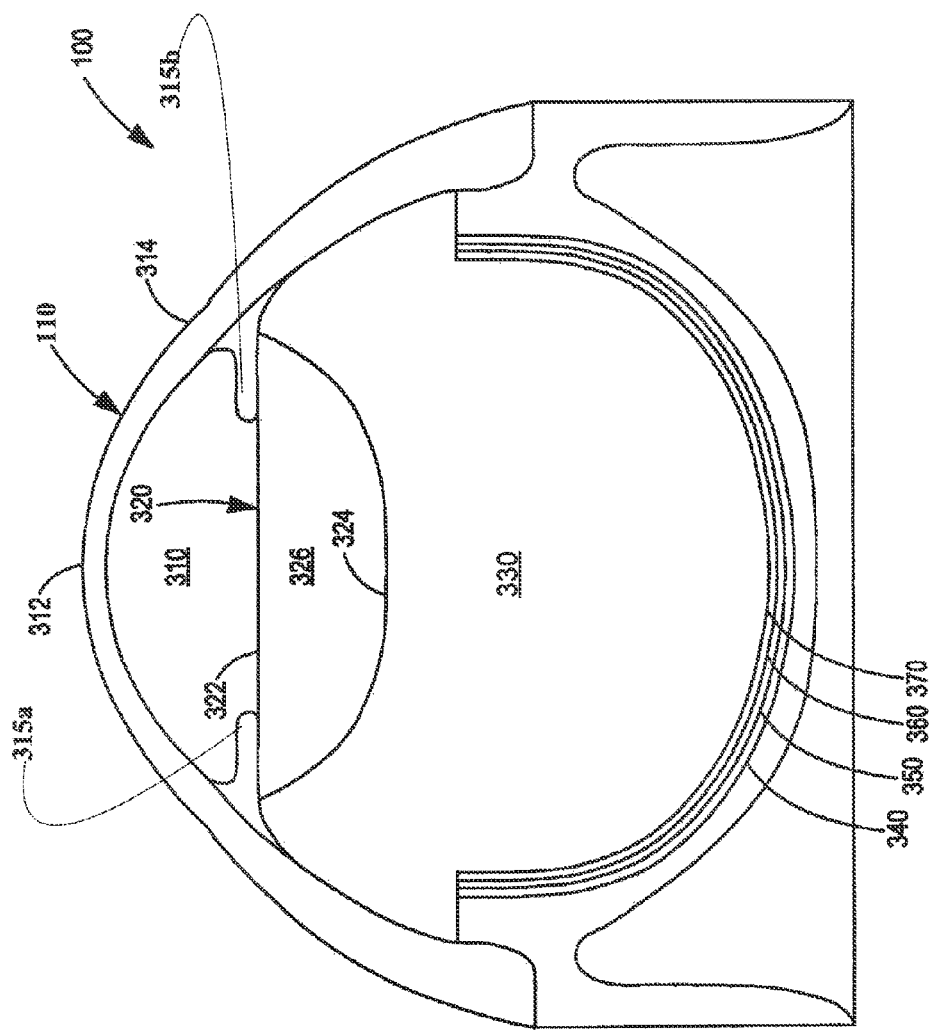
FIG. 3 is a cross-sectional view of Applicants' model eye showing three retinal layers.

Referring now to FIG. 3, a human cornea comprises a varying thickness, wherein that thickness is greatest at the periphery and decreases to a minimum thickness in the middle. Cornea portion 110 is formed to mimic the varying thickness of the human cornea. Cornea portion 110 comprises center point 312. Cornea portion 110 is formed to comprise a minimum thickness between about 0.45 mm and about 0.55 mm at center point 312. Cornea portion 110 is formed to comprise a maximum thickness of between about 0.6 mm and about 0.8 mm at periphery 314 of cornea 110.

Applicants' model eye 100 further comprises iris 315 and a lenticular bag 320 disposed therein. FIG. 3 shows iris portion 315a and iris portion 315b. As those skilled in the art will appreciate, iris portions 315a and 315b are each disposed in a continuous, annular iris element, wherein that annular iris element is continuously attached to an inner surface of assembly 105 along border 107. In certain embodiments the distal ends of iris portions 315a and 315b are separated by a distance 316. Distance 316 can be varied. In certain embodiments, distance 316 is 8 mm.

Lenticular bag 320 is continuously attached to iris 315. Iris 315 in combination with lenticular bag 320 and with a portion of the inner surface of assembly 105 disposed above the iris define anterior chamber 310. Anterior chamber 310 is filled with a first fluid having a first viscosity. In certain embodiments, the first fluid comprises a viscosity of water.

Filled lenticular bag 320 mimics the capsule surrounding the lens in the human eye. In a normal human eye, the lens is surrounded by a capsule which separates the lens from the vitreous, which is a third fluid disposed in chamber 330 located in the back of the eye, and the aqueous, which is the first fluid disposed in anterior chamber 310 located in the front of the eye. The second fluid disposed in posterior chamber 330 comprises a second viscosity, wherein the second viscosity is greater than the first viscosity. This capsule comprises an anterior portion separating the lens from the aqueous humor, and a posterior portion separating the lens from the vitreous humor.

The human eye comprises a plurality of retinal layers disposed along the posterior interior surface. Applicants' model eye 100 similarly comprises a plurality of layers, namely layers 350, 360, and 370, disposed in a stack disposed on the curved surface 340 of posterior chamber 330. In certain embodiments, layer 370 comprises a blue color. In certain embodiments, layer 360 comprises a white color. In certain embodiments, layer 350 comprises a red color. In certain embodiments, each layer 350, 360, and 370, are separately formed. In certain embodiments, layers 350, 360, and 370, comprise a thickness between about 0.0002 to about 0.0006 inches.

A vitrectomy is a surgery to remove some or all of the vitreous humor from the eye and may be performed when the retina has detached from the wall of the eye. During a vitrectomy a surgeon inserts a small instrument into the eye and suctions out some or all of the vitreous gel. After the vitreous humor is removed, the surgeon may treat the retina by photocoagulation, by removing fibrous or scar tissue from the retina, by flattening areas where the retina has become detached, or by repairing tears or holes in the retina or macula. Embodiments of Applicants' model human eye 100 can be used to practicing performing a vitrectomy.

Figure 4:
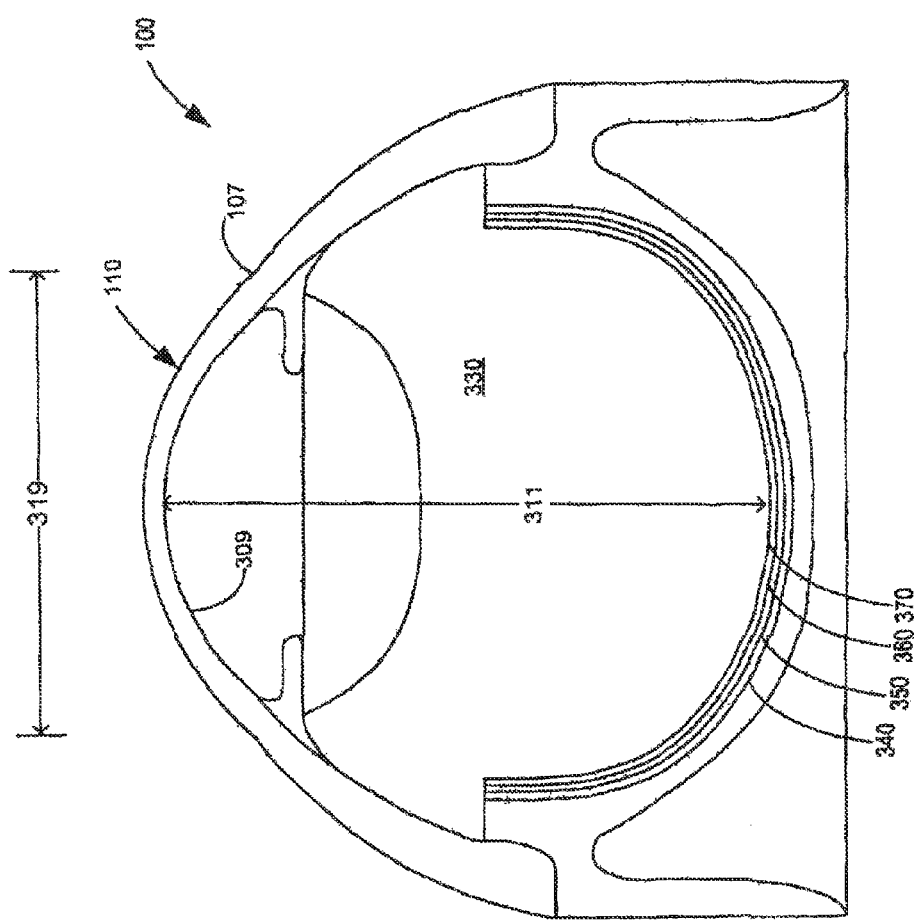
FIG. 4 is a cross-sectional view of Applicants' model showing the axial length.

Referring to FIG. 4, in certain embodiments Applicants' model human eye 100 closely mimics the dimensions of an adult human eye. In such embodiments, distance 311 from the posterior surface 309 of cornea portion 110 to the end of chamber 330, here retinal layer 370, of Applicants' model eye 100 corresponds to the axial length of the human eye. For such embodiments distance 311 is between approximately 18 mm and approximately 33 mm. By "approximately" Applicant means ±10%. In such embodiments diameter 319 at border 107 of cornea portion 110 and scleral portion 120 is greater than approximately 10.5 mm. In certain such embodiments, distance 311 is approximately 24 mm and diameter 319 is approximately 12 mm.

The axial length, corresponding to distance 311 in FIG. 4, is a major determinant in common sight disorders and must be measured to calculate the power of an intraocular lens to be implanted following a cataract surgery. A-scan ultrasound biometry, commonly referred to as A-scan, is routinely used to measure the axial length of an eye and can employ either applanation or water immersion techniques. In performing an applanation A-scan, an anesthetic drop is instilled in the patient's eye and the patient is instructed to look at a target at the end of the probe, or transducer, which is placed directly on the cornea surface.

Because the applanation probe applies pressure to the eye, some compression of the cornea will occur, which can result in an underestimate of the axial length. Typically multiple measurements are taken until an acceptable degree of consistency is obtained, however, when the corneal compression is inconsistent, the measurements can vary substantially from one another. Further inaccuracies can be introduced by the presence of a fluid meniscus between the probe tip and the cornea, which can result in a falsely long axial length. It is estimated that the difficulties in using applanation A-scan to measure the axial length result in only 25% of patients having accurate outcomes. Corneal compression and the presence of a fluid meniscus result in as much as 40% of patients having intraocular lenses which are more myopic than expected and another 25% being more hyperopic than expected. Applicants' model eye 100, preferably having at least one retinal layer, can be used to practice accurately measuring the axial length by applanation A-scan ultrasound biometry.

In performing an immersion A-scan, a scleral shell, cup, or other device is placed on the eye and holds the probe a fixed distance from the cornea, surrounded by a coupling fluid. The coupling fluid can be, and without limitation, saline solution, hydroxypropyl methylcellulose, balanced salt solution, or artificial tears. While the immersion A-scan produces more accurate readings, because the probe is not in direct contact with the eye, the sound waves must pass through the coupling fluid before reaching the back of the eye, making it more difficult to judge the layers of the internal eye, especially when a dense cataract is present. Applicants' model eye 100, preferably having at least one retinal layer, can be used to practice accurately measuring the axial length by immersion A-scan ultrasound biometry.

A third method for measuring the axial length of the eye is by optical coherence biometry (OCB), also termed partial coherence interferometry (PCI), laser interference biometry (LIB), or laser Doppler interferometry (LDI), which relies on a laser Doppler technique to measure the echo delay and intensity of infrared light reflected back from tissue interfaces. Applicants' model eye 100, preferably having at least one retinal layer, can be used to practice accurately measuring the axial length by OCB.

In certain embodiments, Applicants' invention includes a set of two or more model human eyes 100, wherein each eye comprises a different axial length 311. The actual axial length of each of the model eyes 100 in the set has been previously determined.

Practitioners using Applicants' set of model eyes are given an opportunity to access their skills using multiple model eyes, where each of the model eyes has a different known axial length. By providing model eyes having known axial lengths, and in particular known axial lengths which differ from one another, practitioners will readily be able to determine if they have correctly measured the axial length using any known technique, including, but not limited to A-scan ultrasound biometry and OCB, by comparing the known axial length with the measured axial length.

While the preferred embodiments of the present invention have been illustrated in detail, it should be apparent that modifications and adaptations to those embodiments may occur to one skilled in the art without departing from the scope of the present invention as set forth in the following claims.

We claim:

1. A model human eye for use in practicing surgical techniques, comprising:
    a hemispherical-shaped bottom assembly comprising a bowl-shaped substrate disposed therein;
    a retinal layer disposed on the bowl-shaped substrate; and
    a hemispherical-shaped top portion attached to the bottom portion, the top portion comprising a visually transparent cornea portion and a visually opaque sclera portion;
    wherein the cornea portion and the sclera portion are integrally molded, wherein the cornea portion comprises a posterior corneal surface, wherein a distance from the posterior corneal surface to the retinal layer is an axial length; wherein the axial length is between approximately 18 mm and approximately 33 mm;
    wherein the representative human eye is structurally suited for practicing medical procedures selected from the group consisting of:
    A-scan ultrasound biometry; and
    optical coherence biometry.

2. A method to practice surgical techniques on a model human eye, comprising:
    supplying the model human eye comprising:
        a hemispherical-shaped bottom assembly comprising a bowl-shaped substrate disposed therein;
        a retinal layer disposed on the bowl-shaped substrate; and
        a hemispherical-shaped top portion attached to the bottom portion, the top portion comprising a visually transparent cornea portion and a visually opaque sclera portion;
        wherein the cornea portion and the sclera portion are integrally molded, wherein the cornea portion comprises a posterior corneal surface, wherein a distance from the posterior corneal surface to the retinal layer is an axial length; wherein the axial length is between approximately 18 mm and approximately 33 mm;
    wherein the representative human eye is structurally suited for practicing medical procedures selected from the group consisting of:
    A-scan ultrasound biometry; and
    optical coherence biometry;
    and
    practicing a medical procedure using the model human eye.

3. The method of claim 2, wherein the cornea portion further comprises an anterior corneal surface, said measuring further comprising applying a probe to the anterior surface.

4. The method of claim 2, wherein the cornea portion further comprises an anterior corneal surface, said measuring further comprising:
    placing a scleral shell in contact with the sclera portion, wherein the device is configured to hold a probe a fixed distance from the anterior corneal surface;
    filling a portion of the scleral shell with a coupling fluid; and placing a probe within the coupling fluid.

5. The method of claim 2, wherein the method further comprises calculating a power of an intraocular lens.

6. A method to practice surgical techniques on a model, comprising:
    supplying a first model human eye and a second model human eye, each comprising:
        a hemispherical-shaped bottom assembly comprising a bowl-shaped substrate disposed therein;
        a retinal layer disposed on the bowl-shaped substrate, and
        a hemispherical-shaped top portion attached to the bottom portion, the top portion comprising a visually transparent cornea portion and a visually opaque sclera portion, wherein the cornea portion and the sclera portion are integrally molded, wherein the cornea portion comprises a posterior corneal surface, wherein a distance from the posterior corneal surface to the retinal layer is an axial length;
    wherein each model human eye is structurally suited for practicing medical procedures selected from the group consisting of:
    A-scan ultrasound biometry; and
    optical coherence biometry;
    measuring the axial length of the first model human eye; and
    measuring the axial length of the second model human eye, wherein the axial length of the first model human eye differs from the axial length of the second model human eye.

* * * * *